(12) United States Patent
Srivastava et al.

(10) Patent No.: US 11,729,861 B2
(45) Date of Patent: *Aug. 15, 2023

(54) FAST ROLE SWITCH BETWEEN BLUETOOTH TRUE WIRELESS STEREO (TWS) EARBUDS

(71) Applicant: QUALCOMM Incorporated, San Diego, CA (US)

(72) Inventors: Dishant Srivastava, Bangalore (IN); Mayank Batra, Cambridge (GB)

(73) Assignee: QUALCOMM Incorporated, San Diego, CA (US)

(*) Notice: Subject to any disclaimer, the term of this patent is extended or adjusted under 35 U.S.C. 154(b) by 149 days.

This patent is subject to a terminal disclaimer.

(21) Appl. No.: 17/319,329

(22) Filed: May 13, 2021

(65) Prior Publication Data

US 2021/0352766 A1 Nov. 11, 2021

Related U.S. Application Data

(63) Continuation of application No. 16/401,917, filed on May 2, 2019, now Pat. No. 11,013,062.

(30) Foreign Application Priority Data

Jan. 31, 2019 (IN) .............................. 201941003881

(51) Int. Cl.
*H04L 12/28* (2006.01)
*H04W 84/20* (2009.01)
(Continued)

(52) U.S. Cl.
CPC ........... *H04W 84/20* (2013.01); *H04W 36/30* (2013.01); *H04W 52/0274* (2013.01);
(Continued)

(58) Field of Classification Search
CPC .. H04M 2250/02; H04R 1/1016; H04W 4/80; H04W 72/0446; H04W 84/20
(Continued)

(56) References Cited

U.S. PATENT DOCUMENTS 10,631,363 B1 * 4/2020 Xian ................. H04W 52/0251
11,013,062 B2 5/2021 Srivastava
(Continued)

OTHER PUBLICATIONS

Abhyankar S., et al., "On the Application of Traffic Engineering Over Bluetooth ad hoc Networks", Proceedings 6th. ACM International Workshop on Modeling, Analysis and Simulation of Wireless and Mobile Systems. ACM MSWIM 2003. San Diego, CA, Sep. 19, 2003, [ACM International Workshop on Modeling, Analysis and Simulation of Wireless and Mobile SY, Sep. 19, 2003 (Sep. 19, 2003), pp. 116-123, XP058304569, DOI: 10.1145/940991.941011, ISBN: 978-1-58113-766-8, p. 117, left-hand colunmn, line 16—p. 119, right-hand column, line 6.
(Continued)

*Primary Examiner* — John Pezzlo
(74) *Attorney, Agent, or Firm* — Qualcomm Incorporated

(57) ABSTRACT

This disclosure provides systems, methods and apparatus, including computer programs encoded on computer storage media, for fast role switching between master and slave roles among wireless nodes. In one aspect, wireless nodes, such as wireless earbuds, coupled to a wireless source, may dynamically and intelligently swap master and slave roles to optimize battery life in the wireless nodes.

17 Claims, 7 Drawing Sheets

(51) Int. Cl.
　　　*H04W 76/14*　　　(2018.01)
　　　*H04W 36/30*　　　(2009.01)
　　　*H04W 52/02*　　　(2009.01)
　　　*H04W 76/23*　　　(2018.01)
　　　*H04J 1/16*　　　(2006.01)

(52) U.S. Cl.
　　　CPC ....... *H04W 52/0296* (2013.01); *H04W 76/14* (2018.02); *H04W 76/23* (2018.02)

(58) Field of Classification Search
　　　USPC ................. 370/252, 278, 442, 449
　　　See application file for complete search history.

(56) References Cited

U.S. PATENT DOCUMENTS

| | | |
|---|---|---|
| 2003/0210756 A1 | 11/2003 | Ito |
| 2004/0166864 A1 | 8/2004 | Hill et al. |
| 2004/0258185 A1 | 12/2004 | Kihara |
| 2005/0059345 A1 | 3/2005 | Palin et al. |
| 2007/0105548 A1 | 5/2007 | Mohan et al. |
| 2007/0268875 A1* | 11/2007 | Lee .................. H04W 84/20 370/346 |
| 2016/0080892 A1 | 3/2016 | Basalamah et al. |
| 2016/0219358 A1 | 7/2016 | Shaffer et al. |
| 2016/0359925 A1* | 12/2016 | Song .................. H04L 65/1069 |
| 2017/0078836 A1* | 3/2017 | Song .................. H04W 8/005 |
| 2018/0199282 A1 | 7/2018 | Newham |

OTHER PUBLICATIONS

Anonymous: "Bluetooth Core Specification, v5.1 (passage)", Jan. 21, 2019 (Jan. 21, 2019), p. 1, 491-493, 625-628, XP055685592, Retrieved from the Internet: URL: https://www.bluetooth.org/docman/handlers/downloaddoc.ashx?doc id=457080, [retrieved on Apr. 15, 2020], pp. 491-493, pp. 625-628.

International Search Report and Written Opinion—PCT/US2020/012342—ISA/EPO—dated Apr. 24, 2020.

* cited by examiner

FAST ROLE SWITCH BETWEEN BLUETOOTH TRUE WIRELESS STEREO (TWS) EARBUDS

CROSS-REFERENCE TO RELATED APPLICATIONS

The Present Application for Patent is a Continuation Application of U.S. patent application Ser. No. 16/401,917, filed May 2, 2019, entitled "FAST ROLE SWITCH BETWEEN BLUETOOTH TRUE WIRELESS STEREO (TWS) EARBUDS" which claims priority to Indian Provisional Patent Application No. 201941003881, filed Jan. 31, 2019, entitled "FAST ROLE SWITCH BETWEEN BLUETOOTH TRUE WIRELESS STEREO (TWS) EARBUDS" and assigned to the assignee hereof. The disclosure of the prior Application is considered part of and is incorporated by reference in this Patent Application.

TECHNICAL FIELD

This disclosure relates generally to communications between electronic devices, and more particularly to reliable wireless communication between electronic devices.

DESCRIPTION OF THE RELATED TECHNOLOGY

Advances in electronic technology have reduced the cost of increasingly complex and useful wireless communication devices. Cost reduction and consumer demand have proliferated the use of wireless communication devices such that they are practically ubiquitous in modern society. As the use of wireless communication devices has expanded, so has the demand for new and improved features of wireless communication devices. More specifically, wireless communication devices that perform new functions, or that perform functions faster, more efficiently or more reliably are often sought after.

A wireless communication device may make use of one or more wireless communication technologies. For example, a wireless communication device may communicate using Bluetooth technology. A Bluetooth-enabled device may send and receive data to other Bluetooth-enabled devices. For example, a Bluetooth-enabled smartphone may send and receive one or more audio streams to a Bluetooth earbud in a Bluetooth stereo earbud pair topology (i.e., no wire between the ears). As Bluetooth stereo earbuds increase in popularity, it is desirable to improve the reliability of the audio stream while balancing power consumption among the Bluetooth stereo earbud pair.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for role switching between a first sink device and a second sink device, where the first sink device is currently serving a role of a master device, and the second sink device is currently serving a role of a slave device. The method includes obtaining, by the second sink device, a clock (CLK) signal of the first sink device; obtaining, by the second sink device, a Bluetooth slot boundary signal of the first sink device; receiving, by the second sink device, a link manager protocol (LMP) role change request from the first sink device; sending, by the second sink device, an LMP role change acceptance command to the first sink device; and switching the roles of the first and second sink devices in less than two polling intervals (2*Tpoll) from the LMP role change request, wherein the first sink device begins serving the role of the slave device, and the second sink device begins serving the role of the master device.

In some implementations, the first and second sink devices are wireless earbuds. In some implementations, the second sink device obtains the CLK signal and Bluetooth slot boundary signal over a Bluetooth communication link with the first sink device.

In some implementations, the second sink device obtains the CLK signal and Bluetooth slot boundary signal by passively listening on a wireless connection between the first sink device and a source device. In some implementations, the source device is one of a smartphone, a mobile device, a laptop computer, a tablet device, a wearable device, an Internet of Things (IoT) device, an Internet of Everything (IoE) device, an IoT hub, or an IoE hub.

In some implementations, the LMP role change request is based on determining that radio channel conditions between the first sink device and a source device are less favorable than radio channel conditions between the second sink device and the source device. In some other implementations, the LMP role change request is based on determining that a remaining battery charge at the first sink device is less than a remaining battery charge at the second sink device.

In some implementations, switching the roles of the first and second sink devices includes swapping media access control (MAC) addresses in link keys associated with the first and second sink devices.

Another innovative aspect of the subject matter described in this disclosure can be implemented in a second wireless node in wireless communication with a first wireless node, where the first wireless node is serving a role of a master node, and the second wireless node is serving a role of a slave node. The second wireless node includes a processor, and a memory in electronic communication with the processor. The second wireless node includes instructions stored in the memory and operable, when executed by the processor, to cause the second wireless node to: obtain a clock (CLK) signal of the first wireless node; obtain a Bluetooth slot boundary signal of the first wireless node; receive a link manager protocol (LMP) role change request from the first wireless node; send an LMP role change acceptance command to the first wireless node; and switch to the role of the master device in less than two polling intervals (2*Tpoll) from the LMP role change request.

In some implementations, the first and second wireless nodes are wireless earbuds.

In some implementations, the CLK signal and Bluetooth slot boundary signal are obtained over a Bluetooth communication link with the first wireless node. In some implementations, the CLK signal and Bluetooth slot boundary signal are obtained by passively listening on a wireless connection between the first wireless node and a source device.

In some implementations, the LMP role change request is based on determining that radio channel conditions between the first wireless node and a source device are less favorable than radio channel conditions between the second wireless node and the source device. In some other implementations, the LMP role change request is based on determining that a remaining battery charge at the first wireless node is less than a remaining battery charge at the second wireless node.

Additionally, the second wireless node can be implemented to perform any of the aspects of the innovative method described above.

Another innovative aspect of the subject matter described in this disclosure can be implemented in a non-transitory computer-readable medium including processor-executable program code configured to cause a processor of a second sink device, in wireless communication with a first sink device, to obtain a clock (CLK) signal of the first sink device, where the first sink device is serving a role of a master device, and the second sink device is serving a role of a slave device; obtain a Bluetooth slot boundary signal of the first sink device; receive a link manager protocol (LMP) role change request from the first sink device; send an LMP role change acceptance command to the first sink device; and switch to the role of the master device in less than two polling intervals (2*Tpoll) from the LMP role change request.

In some implementations, the CLK signal and Bluetooth slot boundary signal are obtained over a Bluetooth communication link with the first sink device. In some implementations, the CLK signal and Bluetooth slot boundary signal are obtained by passively listening on a wireless connection between the first sink device and a source device.

In some implementations, the LMP role change request is based on determining that radio channel conditions between the first sink device and a source device are less favorable than radio channel conditions between the second sink device and the source device. In some other implementations, the LMP role change request is based on determining that a remaining battery charge at the first sink device is less than a remaining battery charge at the second sink device.

In some implementations, the first and second sink devices are wireless earbuds.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
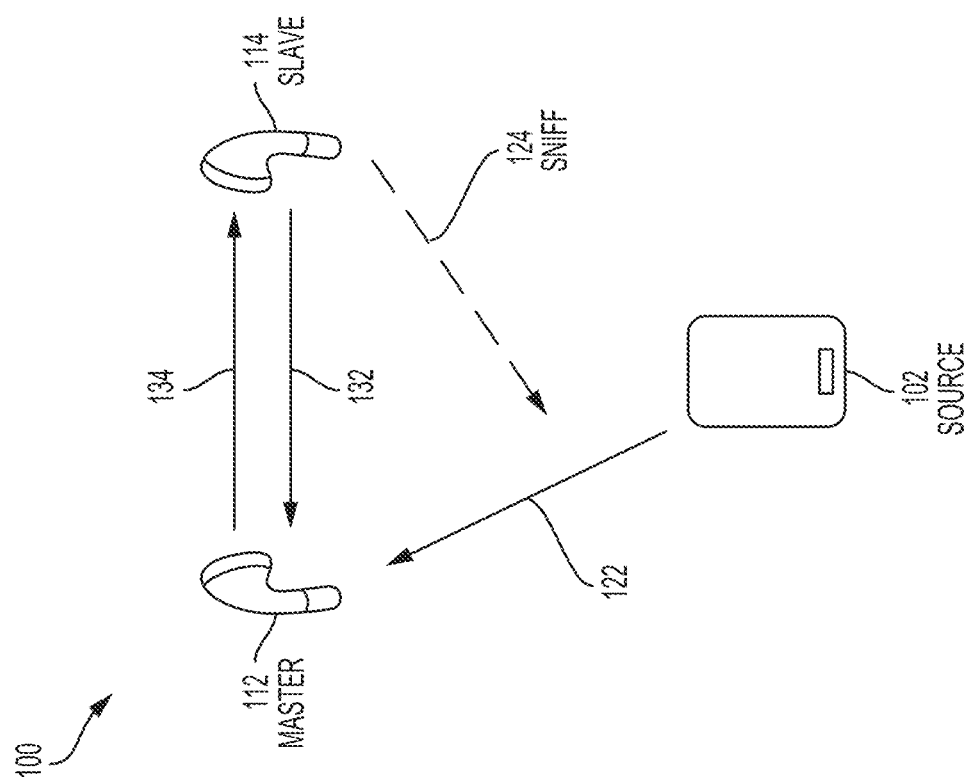
FIG. 1 shows an example topology of a source device communicating with one or more sink devices.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving RF signals according to any of the wireless communication standards, including any of the IEEE 802.11 standards, the IEEE 802.15.1 Bluetooth® standards, Bluetooth low energy (BLE), code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

As mobile device and wireless technologies continue to improve and grow in popularity, short-range wireless technologies are expected to supplant or replace the need for connecting devices together using cables or wires. As part of this evolution, composite electronic devices made up of multiple independent wireless-enabled devices are beginning to emerge, and it is becoming more common for individual electronic components to require wireless communications with multiple components and devices. Such communications may have a disproportionate impact on the battery life of each constituent component in a composite electronic device, and distributing the energy consumption costs amongst constituent components of a composite electronic device may become an important and challenging design criterion.

Various implementations are described herein using Bluetooth and Bluetooth-related terminology as a convenient example of a communications technology for wirelessly connecting electronic devices located within a relatively short distance of one another, such as less than about 100 meters. While this disclosure uses examples referring to Bluetooth, a person having ordinary skill in the art will readily recognize that examples referring to Bluetooth technology are for illustration purposes only and are not intended to limit the descriptions or the claims to that particular standard. For example, WiFi, or other similar short wave wireless communication technologies can be used herein. Therefore, the scope of the claims should not be construed as requiring Bluetooth technology unless specifically recited as such in the claims.

Bluetooth technology provides a secure way to connect and exchange information between electronic devices, such as smartphones, other cellular phones, headphones, earbuds, smartwatches, laptops, wearables, etc. Because many of the services offered over Bluetooth can expose private data or allow the connecting party to control the connected device, Bluetooth requires that devices first establish a "trust relationship" before they are allowed to connect to one another. This trust relationship may be established using a process called "pairing" in which a bond formed between the two devices. This bond enables the devices to communicate with each other in the future without further authentication.

The pairing process may be triggered by a specific request to create a bond (such as by a user explicitly requesting to "add a Bluetooth device"), or may be triggered automatically (such as by connecting to a service). For example, a Bluetooth device may automatically initiate the performance of the pairing operations each time the device is powered on or moved within a certain distance of another Bluetooth device. Pairing information relating to current and previously established pairings may be stored in a paired device list (PDL) in the memory of the Bluetooth device. This pairing information may include a name field, an address field, a link key field, and other similar fields (such as "profile" type, etc.) useful for authenticating the device or establishing a Bluetooth communication link.

Bluetooth communications may require establishing wireless personal area networks (also referred to as "ad hoc" or "peer-to-peer" networks). These ad hoc networks are commonly called "piconets." Each device may belong to multiple piconets. Multiple interconnected piconets may be called scatternets. A scatternet may be formed when a member of a first piconet elects to participate in a second piconet.

A Bluetooth "profile" describes general behaviors through which Bluetooth-enabled devices communicate with other Bluetooth devices. For example, the hands free profile (HFP) describes how a Bluetooth device (such as a smartphone) may place and receive calls for another Bluetooth device, and the Advanced Audio Distribution Profile (A2DP) describes how stereo-quality audio may be streamed from a first Bluetooth device (such as a smartphone) to another Bluetooth device (such as an earbud). Likewise, the Audio/Video Remote Control Profile (AVRCP) provides an interface that enables a single remote control (or other device) to control all of the devices (such as televisions, stereos, etc.) to which a user has access.

Bluetooth devices may connect to two or more devices at a time using different Bluetooth profiles. For example, a Bluetooth receiver device (such as an earbud) may connect to two Bluetooth source devices (such as a media player and a smartphone) at the same time using the A2DP and HFP profiles, respectively. This allows the user to listen to music streamed from the first source device (i.e., the media player) using A2DP while allowing the second source device (i.e., the smartphone) to automatically interrupt the play of music to stream speech using HFP (such as an incoming telephone call), and then automatically return to streaming music from the media player using A2DP at the conclusion of the telephone call.

Bluetooth implements a master-slave structure in which a single master Bluetooth device (referred to herein simply as the "master device") may communicate with up to seven active slave Bluetooth devices (herein simply "slave devices") in a piconet. Master and slave devices generally have asymmetrical roles, and communications between master and slave devices are typically facilitated by the master device. For example, the master device is responsible for receiving, and then sending, forwarding, or otherwise relaying data from a source device (such as a smartphone, or smartwatch, etc.) to the slave device. On the other hand, slave devices, may be responsible for monitoring, polling or sniffing to receive information from the master device. These asymmetrical roles may result in the master device performing operations that consume a different amount of energy than the operations performed by the slave devices, causing the master device to deplete its battery faster than the slave devices.

The techniques described herein relate to devices methods, systems, and apparatuses configured to balance power consumption among wireless devices operating in a master-slave configuration by exchanging master and slave roles quickly, seamlessly, and in a manner less noticeable to a source device or a user.

In a typical Bluetooth radio network, two devices establish a connection by executing Inquiry/Inquiry Scan and Page/Page Scan operations. The device intending to serve the master role, i.e., master device, will stay in an Inquiry state and will send an inquiry identification (ID) packet to the device intending to serve the slave role, i.e., slave device. The slave device may reply to the master device with a frequency hopping selection (FHS) packet that contains the information of its Bluetooth device address (BD_ADDR) and native clock (CLK) signal so that the master device can estimate its page hopping sequence. After sending the FHS packet, the slave device may enter the Page Scan state, while the master device, which is currently in an inquiry state, may enter the Page State and estimate the channel the slave device intends to operate in, given the information received in the FHS packet. The master device may reply to the slave device with an FHS packet, so the slave device knows the BD_ADDR and CLK information of the master device. After accepting the exchange of information from the respective FHS packets, the master device and slave device create a connection.

In some implementations, the master device may wish to switch roles with the slave device. For example, as described above, if the master device, the slave device, or the source device, determines that the remaining battery charge at the master device is below a threshold charge value, or is less than a remaining battery charge at the slave device, the master device may initiate a role switch request. In another example, role switches may occur if the link quality between the source device and the slave device is better than the link quality between the source device and the master device, one of the devices may initiate a role switch request. Additionally, role switches may occur if the microphone quality is better on the slave device than on the master device. As described herein, the source device can be implemented in a wide variety of designs, having varying degrees of form factors and functionalities, all of which including the ability to transmit and receive data, including audio data, wirelessly. The master and slave devices, also known as wireless nodes or sink devices, also can be implemented in a wide variety of designs, and including the ability to transmit and receive data wirelessly. In one example implementation, the source device is a smartphone, and the sink devices are a pair of Bluetooth-enabled wireless earbuds. In some implementations, the earbuds can be implemented as Bluetooth-enabled true wireless stereo (TWS) earbuds, where the earbuds can communicate wirelessly with one another, and with the source device.

In a role switch operation, the master device (such as a first earbud of a pair of Bluetooth-enabled wireless earbuds) will become the slave device, while the slave device (such as a second earbud of the pair of Bluetooth-enabled wireless earbuds) will become the master device. Generally, switching, exchanging or swapping, master and slave roles requires that the communication link between the existing master device (such as the first earbud) and the source device (such as a smartphone) be terminated and a new communication link be established between a new master device (such as the second earbud) and the source device (such as the smartphone). The process of terminating a first communication link and establishing a second communication link may take some time (such as one, two, three, or more seconds), during which the data or audio stream may be interrupted.

By executing the role switch commands defined in the Bluetooth link management protocol (LMP), the master device can request a role switch with the slave device. To execute the role switch, the master device will send a switch request, such as "LMP_switch_req" request, to the slave device. In the switch request, the master device will provide the slot where the role switch will occur. The slave device will respond to the master device with a timing command to recover the inaccuracies of the clock (CLK) signals of the two devices. The slave device will also respond to the master device with a Bluetooth slot boundary timing signal, such as "LMP_slot_offset," to inform the master device as to the difference in the Bluetooth CLK boundaries between the devices. The slave device also will respond to the master device with an acknowledgement and approval of the master device's request, with an acceptance command, such as with an "LMP_accepted" command. In some implementations, the role switch may be initiated by the slave device, in which the slave device sends a Bluetooth slot boundary timing signal, such as "LMP_slot_offset," followed by a switch request, such as "LMP_switch_req," whereby the master device may respond with an acceptance command, such as with "LMP accepted."

Based on the exchange of commands, the master and slave devices will schedule a role switch instant to occur at some time in the future. Per the Bluetooth Specification 5.0, the basic piconet physical channel is divided into time slots, each slot being 625 microseconds (us, or 0.625 milliseconds (ms)). Based on the Bluetooth Specification 5.0, the role switch instant should occur at least 80 slots (i.e., 2*polling interval (Tpoll), where Tpoll=40 slots or 25 ms (i.e., 40*0.625 ms)) from the acceptance command (i.e., LMP_accepted). Although, in some implementations, the role switch instant may be scheduled to occur at 240 slots (i.e., 6*Tpoll) to be safe and avoid instant pass errors. Having a delay of 80-240 slots (i.e., 2*Tpoll to 6*Tpoll, or 50-150 ms) in the role switch instant can result in the master and slave devices failing to communicate for a period of time, which can degrade user experience.

The techniques described herein allow the slave device, i.e., the second earbud, to inherit, or otherwise obtain, the CLK signal and Bluetooth slot boundary timing of the master device, i.e., the first earbud, thereby enabling a "fast" role switch between the devices during a seamless link handover. In some implementations, the fast role switch can occur in approximately 8-24 slots, or 5-15 ms, i.e., 10× faster than traditional role switching. In the implementations described herein, the requirement of sending the LMP_slot_offset command from the slave device to the master device during the role switch can be eliminated. Additionally, the requirement of sending the FHS packet, which includes the BD_ADDR and CLK signals, from the master device, to the slave device can be eliminated. By eliminating the requirements of sending the LMP_slot_offset command and FHS packet(s), the role switch instant can be implemented to occur in fewer than 80 slots from the LMP_accepted command, and as a corollary, sooner than 2*Tpoll as specified in the Bluetooth Specification.

Particular implementations of the subject matter described in this disclosure can be implemented to realize one or more of the following potential advantages. The disclosed techniques enable intelligent and dynamic swapping of the master and slave roles among two or more wireless nodes coupled to a data or audio source device. The role swapping techniques may be implemented to optimize battery life, or optimize radio channel conditions in the wireless nodes. For example, the master and slave devices may cooperate to dynamically swap roles in a manner that balances the load on each device's battery (i.e., the device having the most charge remaining operates as the master, etc.). In some implementations, the techniques may enable the battery levels of the master and slave devices to be depleted at approximately the same rate. Additionally, the role swapping techniques may be implemented to reduce disruption to the data or audio streams received from the source device. The role switch may occur without the user perceiving any changes in the operations of the wireless nodes or the source device, thereby improving user experience.

FIG. 1 shows an example topology 100 of a source device communicating with one or more sink devices. The source device, or electronic device 102, is capable of wireless communication, and can be implemented to communicate wirelessly with one or more sink devices, such as wireless earbuds 112 and 114. In this depicted first generation true wireless stereo (TWS) earbuds example, the electronic device 102 establishes a wireless connection link 122 with a master device, i.e., the wireless earbud 112. Upon establishing the wireless connection link 122 with the wireless earbud 112, the electronic device 102 can commence transmitting data, including an audio stream. The audio stream can include stereo audio data, such as left and right channel data. At other times, the audio stream might include audio received from a phone call, or the voice of a virtual assistant such as Alexa®, Ski® or Cortana®, for example.

The wireless earbud 112 can establish a wireless connection link 134 with the slave device, i.e., the wireless earbud 114, and can begin sending, forwarding, or otherwise relaying, a data or audio stream received from the electronic device 102 to the wireless earbud 114. Additionally, the wireless earbud 112 can provide synchronization information related to the electronic device's 102 piconet to the wireless earbud 114. Such synchronization information can include the Bluetooth Device Address (BD_ADDR) used with the electronic device 102. The wireless earbud 114 in turn can communicate with the wireless earbud 112 over a separate wireless connection link 132. In some implementations, a single connection link, i.e., in lieu of separate wireless connection links 132 and 134, can be established between the wireless earbuds 112 and 114.

In some implementations, and based on the synchronization information, while the electronic device 102 is transmitting a single data or audio stream to the wireless earbud 112 over the wireless connection link 122, the wireless earbud 114 can be implemented to passively listen to the transmitted data or audio stream. For example, the electronic device 102 can transmit an audio stream including stereo audio data for both wireless earbuds 112 and 114 over the wireless connection link 122 to the wireless earbud 112, while the wireless earbud 114 is passively listening, monitoring, eavesdropping, or otherwise "sniffing" 124 the stereo audio data being transmitted over the wireless connection link 122 to the wireless earbud 112. In such an implementation, the wireless earbud 114 can obtain the stereo audio data intended for the wireless earbud 114 even though the electronic device 102 only transmitted the audio stream to the wireless earbud 112. Additionally, by sniffing, the wireless earbud 114 can obtain, inherit or otherwise receive, the clock (CLK) signal and the Bluetooth slot boundary timing signal (i.e., LMP_slot_offset) associated with the wireless earbud 112.

A person having ordinary skill in the art will readily recognize that one sink device can sniff data from another sink's connection to the source device by exchanging the following information between the two sinks: the 128-bit Bluetooth link key; the adaptive frequency hopping (AFH) pattern; and the timestamp when the hopping pattern repeats, and then synchronizing its receiver with the hopping patterns of the other sink. Once synchronized, the link key can be loaded, and the data stream can be identified and decoded, including decoding the stereo codec stream to extract a left or right audio channel, as needed.

In implementations where one wireless earbud is unable to sniff the data or audio stream transmitted to the other wireless earbud, the wireless earbud receiving the data or audio stream can be implemented to forward the data or audio stream to the other wireless earbud. For example, when the electronic device 102 transmits stereo audio data for both wireless earbuds 112 and 114 over the wireless connection link 122 to the wireless earbud 112, and the wireless earbud 114 is unable to passively listen, monitor, eavesdrop, or otherwise sniff 124 the transmitted stereo audio data, the wireless earbud 112 can be implemented to automatically forward, or otherwise relay, the stereo audio data intended for the wireless earbud 114 to the wireless earbud 114. Alternatively, the wireless earbud 112 can be implemented to forward, or otherwise relay, the stereo audio data intended for the wireless earbud 114 upon receiving a forwarding request from the wireless earbud 114.

In a second generation TWS earbuds example implementation (not depicted), the electronic device 102 can establish separate wireless communication links with the wireless earbuds 112 and 114, and can send and receive data and audio streams to each of the wireless earbuds 112 and 114 over the separate wireless communication links, respectively. In such an implementation, each the wireless earbuds 112 and 114 can be implemented to receive synchronization information related to the electronic device's 102 piconet, including the BD_ADDR associated with the electronic device 102. Moreover, each of the wireless earbuds 112 and 114 can receive the CLK signal and Bluetooth Slot Boundary time associated with the other wireless earbud.

As described herein, a source device, which can be implemented to originate and transmit data to one or more sink devices, also may be known as an electronic device. An electronic device also may be referred to as a smartphone, a mobile device, wireless device, a wireless node, a receiver device, a remote device, a handheld device, or a subscriber device, or some other suitable terminology, where the "device" also may be referred to as a unit, a station, a terminal, or a client. The electronic device may be implemented as any computing device configured to receive, process and otherwise handle information, including audio or visual or audio/visual (i.e., video), over a communications network. The electronic device also may be a cellular phone, a personal digital assistant (PDA), a laptop or laptop computer, a tablet device, a personal computer, a gaming console, a virtual or augmented reality device, a drone, an Internet of Things (IoT) device, or other electronic system. IoT devices also may be referred to as an Internet of Everything (IoE) device, an IoT hub, and IoE hub, or any other physical device, vehicle, or home appliance that is embedded with electronics and network connectivity, which enable these objects to connect and exchange data. The IoT device also may be referred to as a virtual assistant device, such as Amazon Alexa®, Google Home®, etc., a wearable device, such as smart watches, Google Glass®, etc., an in-vehicle entertainment or communication system, a home security system, or any device having an interface, such as a network interface, to a communications network and suitable input and output devices. Wearable devices also may be referred to as wearable technology, wearable gadgets, wearables, or some other suitable terminology, which generally describes electronics and software-based technology that is worn on the body, either as an accessory, or as part of material used in clothing.

As described herein, a wireless node, a sink device, or destination device, can be implemented to receive data over a communications medium from one or more source devices. Electronic devices, as described above, also can be implemented as sink devices. In addition, wearable devices, including earbuds, such as Apple AirPods®, Bose SoundSport®, Philips True Wireless®, Samsung Gear®, as well as wireless headphone sets can be implemented as sink devices.

The wireless connection links 122, 124, 132 and 134 also may be known as communication links or wireless data transfers, and can occur over any suitable communication network that enables devices to communicate with one another over a communication medium. Examples of protocols that can be used to form communication networks can include, Bluetooth, Bluetooth Low Energy (BLE), near-field communication (NFC) technology, radio-frequency identification (RFID) technology, Zigbee, or Wi-Fi (i.e., Institute of Electrical and Electronics Engineers (IEEE) 802.11) technology. Additional protocols include the Internet Protocol ("IP"), Transmission Control Protocol ("TCP"), User Datagram Protocol ("UDP"), device-to-device (D2D) protocols, long-term evolution direct (LTE-D), narrow band Internet of Things (NB-IoT), LTE category M (LTE CAT-M), Vehicle-to-X (V2X), or other such types of protocols described throughout this disclosure.

The electronic device 102 can be implemented to communicate directly or indirectly with the wireless earbuds 112 and 114, respectively, using communication protocols provided by one or more of these example communication networks. For example, the electronic device 102 can communicate with the wireless earbuds 112 and 114 over Bluetooth. Additionally, the wireless earbuds 112 and 114 can be implemented to communicate with each other using communication protocols provided by one or more of these example communication networks. For example, the wireless earbud 112 can communicate with the wireless earbud 114 using Bluetooth master and slave topology.

As described above, in some implementations, the master device, i.e., the wireless earbud 112, may wish to switch roles with the slave device, i.e., the wireless earbud 114, via a link handover. A role switch request command, such as "LMP_role_change," may be sent by the wireless earbud 112 to the wireless earbud 114. The wireless earbud 114 may respond to the role switch request command with an acceptance command, such as "LMP_accepted." Since the slave device, i.e., the wireless earbud 114, has been sniffing 124 on the wireless connection link 122 between the electronic device 102 and the master device, i.e., the wireless earbud 112, the wireless earbud 114 knows the BD_ADDR of the electronic device 102, and can inherit or replicate the CLK and Bluetooth slot boundary timing, such as "LMP_slot_offset," of the wireless earbud 112. As such, the wireless earbuds 112 and 114 are not required to exchange FHS packets, which includes the BD_ADDR and CLK signals. Further, the wireless earbud 114 is not required to send an LMP_slot_offset command to the wireless earbud 112 upon a role switch instant, because each device knows the timing information of the other device Eliminating these requirements allows the role switch instant to occur considerably faster than traditional role switch implementations. For example, using the techniques described in this disclosure, the role switch instant may occur in as few as 8-24 slots, as compared to 80-240 slots in a traditional role switch implementation.

Figure 2:
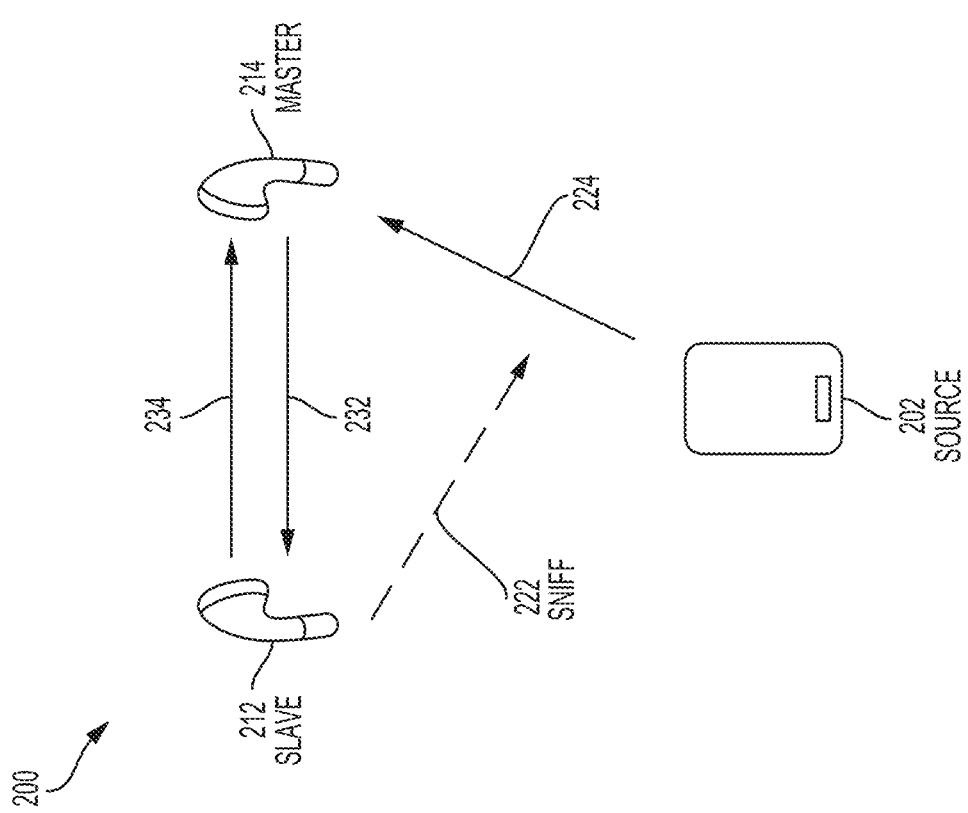
FIG. 2 shows an example topology of a source device communicating with one or more sink devices after a link handover.

FIG. 2 shows an example topology 200 of a source device communicating with one or more sink devices after a link handover. In the depicted example, the wireless earbuds have switched roles, whereby the previous master device, i.e., the wireless earbud 212 (or wireless earbud 112 in FIG. 1), is now the slave device, and the previous slave device, i.e., the wireless earbud 214 (or wireless earbud 114 in FIG. 1), is now the master device. In the depicted first generation TWS earbuds example of FIG. 2, the source device, or electronic device 202, establishes a wireless connection link 224 with the new master device, i.e., the wireless earbud 214. The wireless earbud 214 can establish a wireless connection link 232 with the new slave device, i.e., the wireless earbud 212, and can begin sending, forwarding, or otherwise relaying a data or audio stream received from the electronic device 202 to the wireless earbud 212. Additionally, the wireless earbud 214 can provide synchronization information related to the electronic device's 202 piconet to the wireless earbud 212. Again, such synchronization information can include the Bluetooth Device Address (BD_ADDR) used with the electronic device 202. The wireless earbud 212 in turn can communicate with the wireless earbud 214 over a separate wireless connection link 234. In some implementations, a single connection link, i.e., in lieu of separate wireless connection links 232 and 234, can be established between the wireless earbuds 212 and 214.

In some implementations, and based on the synchronization information, while the electronic device 202 is transmitting a single data or audio stream to the wireless earbud 214 over the wireless connection link 224, the wireless earbud 212 can be implemented to passively listen to the transmitted data or audio stream. For example, the electronic device 202 can transmit an audio stream including stereo audio data for both wireless earbuds 212 and 214 over the wireless connection link 224 to the wireless earbud 214, while the wireless earbud 212 is passively listening, monitoring, eavesdropping, or otherwise "sniffing" 222 the stereo audio data being transmitted over the wireless connection link 224 to the wireless earbud 214. In such an implementation, the wireless earbud 212 can obtain the stereo audio data intended for the wireless earbud 212 even though the electronic device 202 only transmitted the audio stream to the wireless earbud 214. Additionally, by sniffing, the wireless earbud 212 can obtain, inherit or otherwise receive, the CLK signal and the Bluetooth slot boundary time associated with the wireless earbud 214.

In such a link handover implementation, the active asynchronous connectionless links (ACL) and voice over synchronous connection-oriented (SCO, or enhanced SCO (eSCO)) links between the electronic device 202 and the previous master device, i.e., the wireless earbud 212, can be transferred seamlessly to the new master device, i.e., the wireless earbud 214. In this seamless link handover implementation, the electronic device 202 is not involved in the role switching process, and the handover does not result in any disconnection with the electronic device 202. Such seamless link handover implementations may be useful when the battery life of the original master device is waning, and the battery life of the original slave device is robust. Additionally, such seamless link handovers can occur when the connection link quality between the original slave device and the electronic source device is better than the connection link quality between the original master device and the electronic source device. Moreover, if the microphone quality is better between the original slave device and the electronic source device, a seamless link handover may improve user experience.

Figure 3:
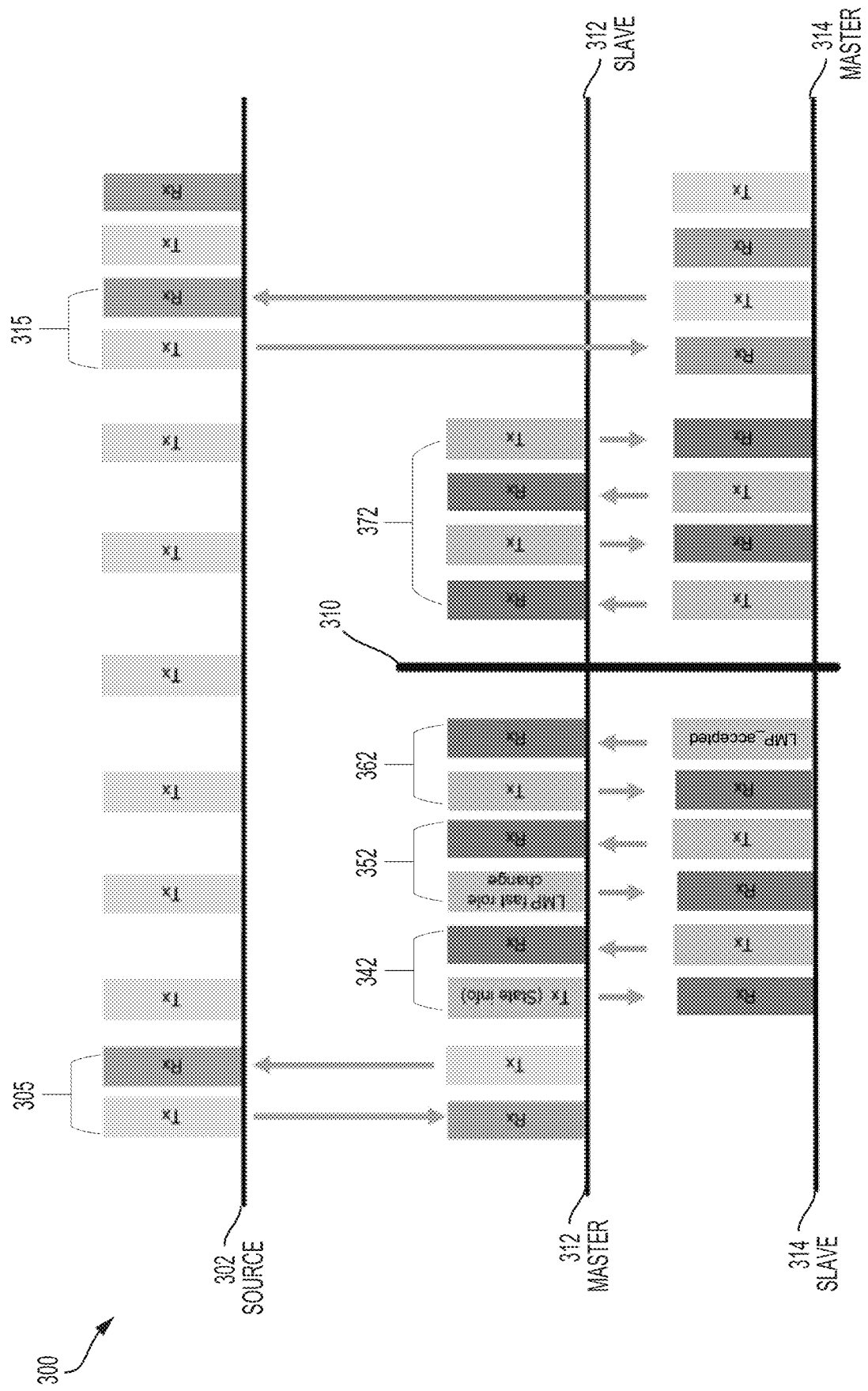
FIG. 3 shows an example fast role switch flow diagram.

FIG. 3 shows an example fast role switch flow diagram 300. The fast role switch flow diagram 300 includes a source device, i.e., an electronic device 302, communicating with a sink device, i.e., a wireless earbud 312 over a bi-directional communication link 305. Via the bi-directional communication link 305, the electronic device 302 transmits data to the wireless earbud 312 and receives data from the wireless earbud 312. The bi-directional communication link 305 can occur over any suitable connection link as described above, but for simplicity in explanation, in this example the bi-directional communication link 305 is over the Bluetooth communication protocol. The wireless earbud 312 also is communicating with another wireless earbud 314 over a bi-directional communication link 342. Again, for simplicity in explanation, the bi-directional communication link 342 is over Bluetooth. The wireless earbud 312 is serving the role of the master device, and the wireless earbud 314 is serving the role of the slave device. As such, the wireless earbud 312 transmits data to the wireless earbud 314 and receives data from the wireless earbud 314. In the depicted example, via the bi-directional communication link 342, the wireless earbud 312 is transmitting state information to the wireless earbud 314. Such state information can include synchronization information related to the wireless earbud's 312 connection with the electronic device 302. For example, the state information can include the BD_ADDR of the electronic device 302, as well as the CLK signal of the wireless earbud 312. By receiving the BD_ADDR and CLK signal, the wireless earbud 314 knows the unique 48-bit identifier assigned to the electronic device 302 as well as timing information associated with the electronic device 302 and the wireless earbud 312. In some implementations, the wireless earbud 314 can obtain, inherit or otherwise receive, the timing information, i.e., CLK signal of the wireless earbud 312, and even the electronic device 302. Additionally, the wireless earbud 314 can synch to the CLK signal of the wireless earbud 312. Upon receiving the transmitted state information, the wireless earbud 314 responds by transmitting at least an acknowledgement to the wireless earbud 312 via the bi-directional communication link 342.

In some implementations, the wireless earbud 312 may want to swap, or switch roles with the wireless earbud 314. For example, if the wireless earbud 312 is experiencing low battery charge conditions, or the batter charge has fallen below a threshold (such as 50% battery charge remaining, 33% battery charge remaining, 25% battery charge remaining, 10% battery charge remaining, etc.) to preserve charge, the wireless earbud 312 may desire to transfer its role as master device to the wireless earbud 314. In another example, if the radio channel conditions associated with the bi-directional communication link 305 between the electronic device 302 and the wireless earbud 312 are less than favorable (i.e., weak Received Signal Strength Indication (RSSI) characteristics, increased cyclic redundancy check (CRC) errors, insufficient protocol acknowledgements, increased interference, high static or signal attenuation, etc.), the wireless earbud 312 may desire to transfer its role as master device to the wireless earbud 314. In such implementations, the wireless earbud 312 can transmit a fast role switch indication to the wireless earbud 314 that it no longer wants to serve as the master device, and instead prefers to serve the role of the slave device.

In the bi-directional communication link 352, the wireless earbud 312 transmits a fast role switch indication, such as "LMP fast role change," to the wireless earbud 314. The fast role switch indication can include a slot position in which the wireless earbuds are to swap master and slave roles. While the slot position may be designated for a future instant, due to the techniques described herein, it may occur sooner in time than the 2*Tpoll role switch instant used in legacy role switching protocols. The wireless earbud 314 receives the fast role switch indication and transmits an acknowledgement in response via the bi-directional communication link 352. In the bi-directional communication link 362, the wireless earbud 312 transmits a protocol acknowledgement to the wireless earbud 314, and in response, the wireless earbud 314 transmits a link management protocol acceptance command, such as "LMP_accepted," to the wireless earbud 312. The wireless earbud 312 receives the acceptance command from the wireless earbud 314, and upon the role switch instant 310, the wireless earbud 312 (previously the master device) swaps roles and becomes a slave device, while the wireless earbud 314 (previously the slave device) swaps roles and becomes a master device.

This fast role switch implementation avoids legacy protocols, which require the wireless earbud 312 to exchange FHS, identification (ID) and CLK information with the wireless earbud 314; the wireless earbud 312 to transmit a LMP_switch_request to the wireless earbud 314, wait for an acknowledgement; later, the wireless earbud 314 responds with an LMP_slot_offset command to the wireless earbud 312, wait for an acknowledgement; later, specify a role switch instant in the future (i.e., at least 2*Tpoll); wait for the future role switch instant to occur; and then, finally, the wireless earbuds switch roles, with the wireless earbud 314 now serving as the master role, and the wireless earbud 312 now serving as the slave role.

During the bi-directional communication link 372, the wireless earbud 314 (new master device) initiates the transmission of data to the wireless earbud 312 (new slave device). The wireless earbud 312 receives the transmitted data and responds by transmitting an acknowledgement to the wireless earbud 314. The wireless earbuds may continue sending and receiving data, as well as sending and receiving protocol acknowledgements over the bi-directional communication link 372. In some implementations, the role switching between the wireless earbuds 312 and 314 is not known to the electronic device 302. For example, the electronic device 302 may assume that the wireless earbud 312 (previously the master device) was simply serving another electronic device in the piconet, and does not realize that the wireless earbud 314 (previously the slave device) has now assumed the role of master device in the wireless earbud relationship. After the role switch 310, the electronic device 302 communicates with the wireless earbud 314 over the bi-directional communication link 315.

Figure 4:
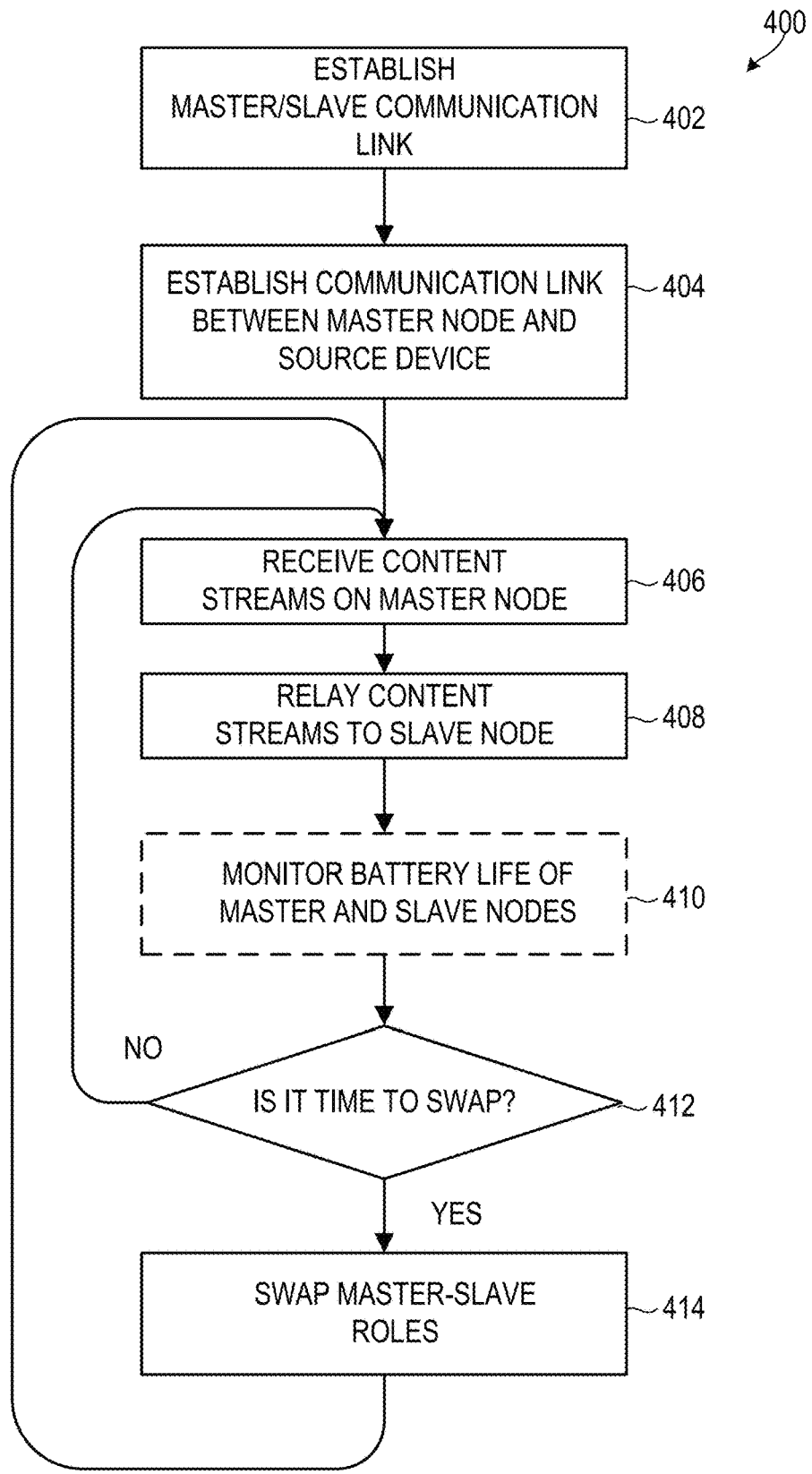
FIG. 4 shows an example method for dynamically switching master and slave roles.

FIG. 4 shows an example method 400 for dynamically switching master and slave roles. The operations in method 400 may be accomplished by processors within wireless nodes or electronic devices, (including source and sink devices, such as the electronic devices 102, 202 and 302, and the wireless earbuds 112, 114, 212, 214, 312 and 314, depicted in FIGS. 1-3), or combinations thereof, configured with processor-executable instructions implementing the method, so references to each wireless node or electronic device encompass the processor within the node or device. In some implementations, the method 400 can be used to balance the load on each wireless node device's battery.

At block 402, a first wireless node (or first earpiece, such as a left earbud) may establish any suitable communication link (such as a Bluetooth link) with a second wireless node (or second earpiece, such as a right earbud). Establishing the communication link may include, for example, the first wireless node negotiating one or more communication parameters with the second wireless node. As part of block 402, the first wireless node may assume a role as a master node (or master device) and the second wireless node may assume a role as a slave node (or slave device).

At block 404, the first wireless node may establish any suitable communication link (such as a Bluetooth link) with a wireless source device (or electronic device, such as a smartphone or smartwatch, etc.).

At block 406, the first wireless node may begin receiving one or more content streams (such as data or audio streams) via a signal from the wireless source device.

At block 408, the first wireless node may begin relaying all or a portion of one or more of the received content streams via a signal to the second wireless node. If desired, the first wireless node also may generate or transmit—to the second wireless node—one or more controls related to processing the relayed content streams via the signal.

At optional block 410, the first wireless node, the second wireless node, and in some implementations, the wireless source device, may monitor the battery consumption of the first and second wireless nodes.

At determination block 412, the first wireless node, the second wireless node, or the wireless source device may determine whether it is time to switch or swap roles. This determination may be based on various factors, such as battery usage, periods of inactivity or silence, a time value, measured energy consumption, processor instructions performed, current battery level, differences in battery states between the first and second wireless nodes, etc. For example, the first wireless node, the second wireless node, or the wireless source device may consider the amount of time that the first wireless node has performed the master role, the amount of battery consumed by the master node or the slave node, the amount of battery remaining on the master node or the slave node, the types or volume of the communications being transmitted, the number of master-specific operations required to process the communications, and other similar factors.

In response to the first wireless node, the second wireless node, or the wireless source device determining that it is not time to swap roles (i.e., determination block 412="No"), the first and second wireless nodes may continue to receive content streams over the established communication links at block 406. In response to the first wireless node, the second wireless node, or the wireless source device determining that it is time to swap roles (i.e., determination block 412="Yes"), the first and second wireless nodes may swap roles at block 414. In some implementations, the first and second wireless nodes may establish a new master-slave communication link during the role swap.

In some implementations, swapping roles at block 414 may further include swapping media access control (MAC) addresses in the link keys associated with the first and second wireless nodes. In some other implementations, at block 414, the MAC address in the link key associated with the new master node (i.e., the second wireless node) may be changed to the MAC address in the link key that was associated with the previous master node (i.e., the first wireless node), and the MAC address in the link key associated with the new slave node (i.e., the first wireless node) may be changed to any desired MAC address.

Figure 5:
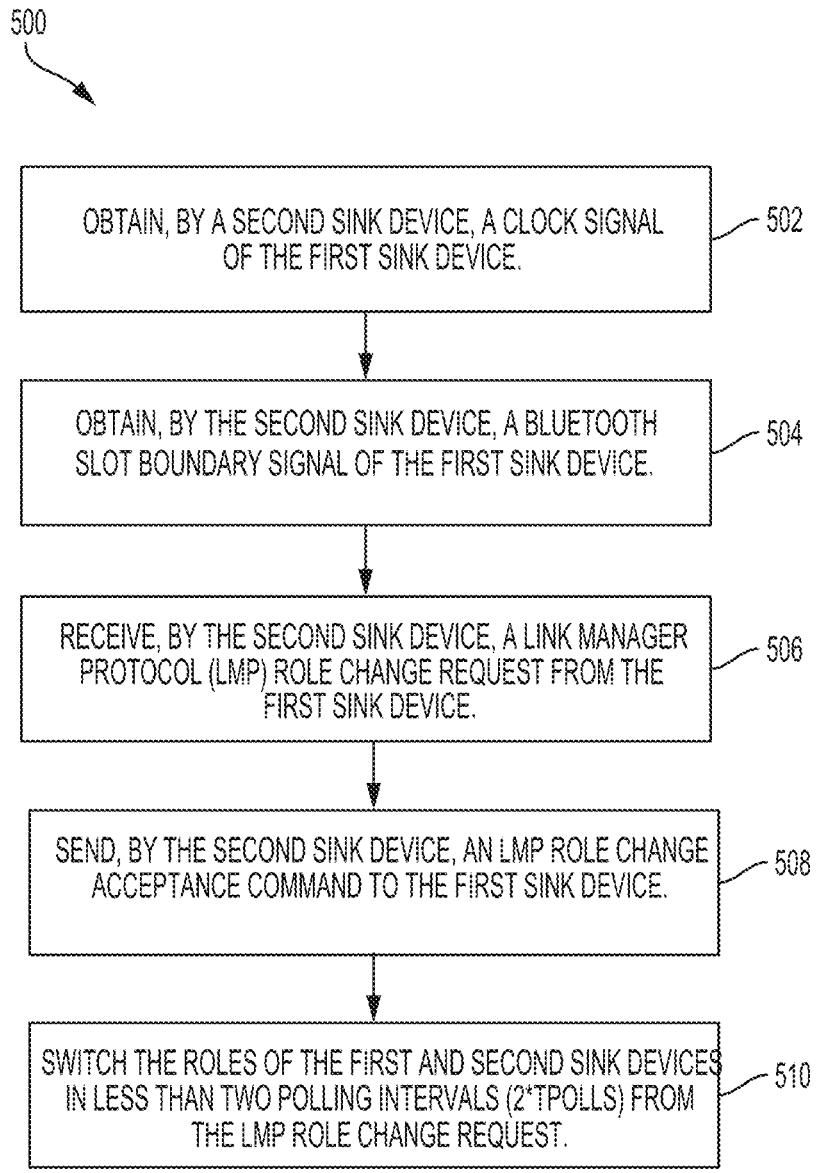
FIG. 5 shows an example method for role switching between a first sink device and a second sink device.

FIG. 5 shows an example method 500 for role switching between a first sink device and a second sink device. The operations of the method 500 may be implemented by the one or more sink devices, i.e., a first sink device and a second sink device, such as the wireless earbuds 112, 114, 212, 214, 312 and 314, depicted and described in FIGS. 1-3, or their components as described throughout.

In some implementations, the described wireless earbuds 112, 114, 212, 214, 312 and 314, may execute a set of codes to control the functional elements of the respective device, or of one or more other devices, to perform the functions described in FIG. 5. Additionally, or alternatively, the described wireless earbuds 112, 114, 212, 214, 312 and 314, may perform aspects of the functions described in FIG. 5 using special-purpose hardware.

A person having ordinary skill in the art will readily recognize that the nomenclature indicating a first sink device and a second sink device can be used interchangeably, and do not necessarily refer to a particular one of the wireless earbuds 112, 114, 212, 214, 312 and 314, as described throughout this disclosure. In this example implementation, the first sink device is intended to indicate that amongst a pair, a group, or a plurality, of sink devices, a source device, such as any of the electronic devices 102, 202 and 302 described herein, first established a wireless connection, or wireless data transfer session, with the first sink device. In such implementations, the first sink device serves the role of the master device in the master/slave relationship, and the second sink device serves the role of the slave device.

At block 502, a clock signal of the first sink device is obtained by the second sink device. The clock signal of the first sink device, or master device, can be obtained by the second sink device, or slave device, over a wireless connection, or wireless data transfer. The wireless connection, or wireless data transfer, can be established over any suitable communication network described throughout this disclosure. In one non-limiting example, the clock signal can be received by the second sink device from the first sink device over the Bluetooth communication protocol. In some implementations, the second sink device obtains the clock signal by passively listening on, monitoring, eavesdropping, or otherwise sniffing, the wireless connection between the first sink device and the source device.

At block 504, a Bluetooth slot boundary signal of the first sink device can be obtained by the second sink device. The Bluetooth slot boundary signal of the first sink device can be obtained by the second sink device over a wireless connection, or wireless data transfer. Again, the wireless connection, or wireless data transfer, can be established over any suitable communication network described throughout this disclosure. In one non-limiting example, the Bluetooth slot boundary signal can be received by the second sink device from the first sink device over the Bluetooth communication protocol. In some implementations, the second sink device obtains the Bluetooth slot boundary signal by passively listening on, monitoring, eavesdropping, or otherwise sniffing, the wireless connection between the first sink device and the source device. In some implementations, the Bluetooth slot boundary signal can be a link manager protocol (LMP) slot offset signal, such as LMP_slot_offset.

At block 506, a link manager protocol (LMP) role change request from the first sink device is received by the second sink device. The LMP role change request of the first sink device can be received by the second sink device over a wireless connection, or wireless data transfer. Again, the wireless connection, or wireless data transfer, can be established over any suitable communication network described throughout this disclosure. In one non-limiting example, the LMP role change request can be received by the second sink device from the first sink device over the Bluetooth communication protocol. In some implementations, the LMP role change request is based on determining that a remaining battery charge at the first sink device is less than a remaining battery charge at the second sink device. In some other implementations, the LMP role change request is based on determining that radio channel conditions between the first sink device and the source device are less favorable than radio channel conditions between the second sink device and the source device.

The term "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

At block 508, an LMP role change acceptance command can be sent by the second sink device to the first sink device. The LMP role change acceptance command can be sent by the second sink device to the first sink device over a wireless connection, or wireless data transfer. Again, the wireless connection, or wireless data transfer, can be established over any suitable communication network described throughout this disclosure. In one non-limiting example, the LMP role change acceptance command can be sent by the second sink device to the first sink device over the Bluetooth communication protocol.

At block 510, the master and slave roles of the first and second sink devices can be switched. In other words, the first sink device (previously the master device) can switch roles and begin serving as the slave device, and the second sink device (previously the slave device) can switch roles and begin serving as the master device. In some implementations, the role switching of the first and second sink devices can occur in less than two polling intervals (2*Tpolls) from the LMP role change request. In some implementations, switching the roles of the first and second sink devices includes swapping media access control (MAC) addresses in link keys associated with the first and second sink devices.

While the example method 500 in FIG. 5 includes five discrete blocks, a person having ordinary skill in the art will readily recognize that other blocks can be inserted between the depicted blocks. Additionally, other blocks may be performed before or after certain depicted blocks.

Figure 6:
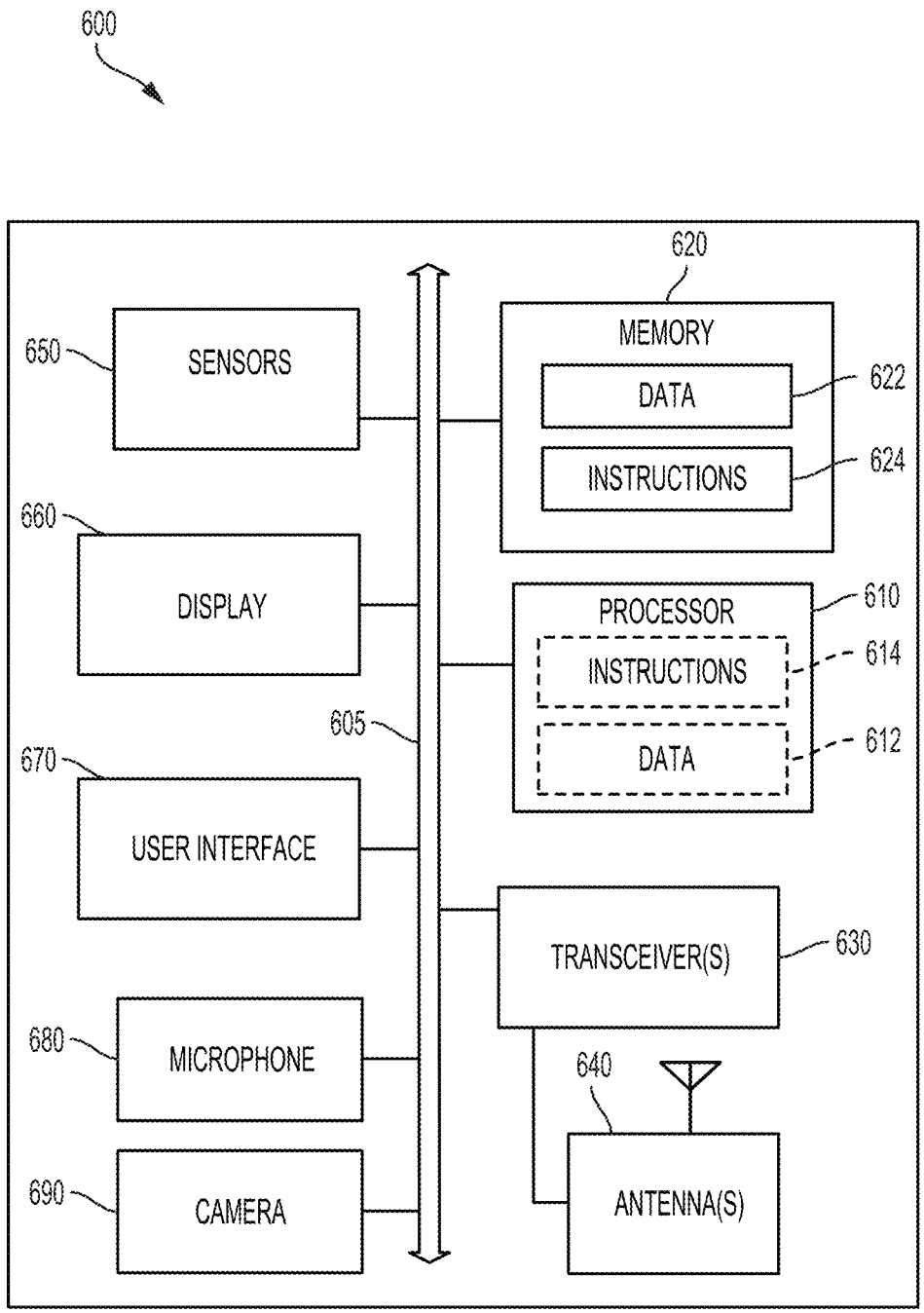
FIG. 6 shows an example source device.

FIG. 6 shows an example source device 600. The source device 600 is representative of a wide variety of electronic devices as described throughout, including and not limited to the electronic devices 102, 202 and 302, depicted in FIGS. 1-3.

The source device 600 can include a processor 610, a memory 620, at least one transceiver 630 (i.e., a transmitter and a receiver), and at least one antenna 640. The source device 600 also can include one or more sensors 650, a display 660, a user interface (UI) 670 (such as a keypad, touchscreen, voice or gesture interface), a microphone 680 (representative of a microphone and a speaker) and a camera 690. Although not depicted, the source device 600 can include one or more network interfaces, such as a wireless network interface (like a Bluetooth interface, a BLE interface, a cellular interface, a Wi-Fi, or other WLAN interface, a WiMAX interface, a ZigBee® interface, a Wireless USB interface, etc.) or a wired network interface (like as a powerline communication interface, an Ethernet interface, etc.). In some implementations, the source device 600 may support multiple network interfaces, each of which may be configured to couple the source device 600 to a different communication network. Each of the components (or "modules") described with reference to FIG. 6 can communicate with one another, directly or indirectly, over at least one bus 605. The bus 605 may include a power bus, a control signal bus, a status signal bus, a data bus, etc. Example buses 605 can include PCI, ISA, PCI-Express, HyperTransport®, InfiniBand®, NuBus, AHB, AXI, etc.

The processor 610 may be a general-purpose single- or multi-chip microprocessor (such as an Advanced RISC (Reduced Instruction Set Computer) Machine (ARM)), a special purpose microprocessor (such as a digital signal processor (DSP)), a microcontroller, a programmable gate array (such as a field programmable gate array (FPGA)), a shift register, etc. The processor 610 may be referred to as a central processing unit (CPU). Although just a single processor 610 is depicted in the source device 600 of FIG. 6, in alternative implementations, a combination of processors (such as an ARM and DSP) including multiple processors, multiple cores, multiple nodes, or implementing multi-threading, etc., can be used.

The source device 600 also includes memory 620 in electronic communication with the processor 610 (i.e., the processor can read information from and write information to the memory 620). Memory 620 can be deemed to be in electronic communication with the processor 610 if the processor 610 can read information from or write information to the memory 620. The memory 620 may be any electronic component capable of storing electronic information. The memory 620 may be configured as random-access memory (RAM), read-only memory (ROM), non-volatile random-access memory (NVRAM), magnetic disk storage media, optical storage media, flash memory devices in RAM, on-board memory included with the processor, erasable programmable read-only memory (EPROM), electrically erasable programmable read-only memory (EEPROM), registers and so forth, including combinations thereof.

Data 622 and instructions 624 may be stored in the memory 620. The instructions may include one or more programs, routines, sub-routines, functions, procedures, code, etc. The instructions may include a single computer-readable statement or many computer-readable statements. The instructions 624 may be executable by the processor 610 to implement the methods disclosed herein. Executing the instructions 624 may involve the use of the data 622 that is stored in the memory 620. When the processor 610 executes the instructions 624, various portions of the instructions 614 may be loaded onto the processor 610, and various pieces of data 612 may be loaded onto the processor 610.

The memory 620 also can store processor- or computer-executable software code containing instructions that, when executed, cause the processor 610 to perform various functions described herein for magnetic communication, including reception of a signal, and generation and transmission of an appropriate response signal.

The processor 610 processes information received through the transceiver 630 as well as information to be sent to the transceiver 630 for transmission through the antenna 640. Additionally, the processor 610 can process information received through one or more sensors 650 as well as information to be presented by the display 660.

In some implementations, the transceiver 630 can be implemented as both a transmitter and a receiver, and can modulate data and provide the modulated data to the antenna 640 for transmission, as well as to demodulate data received from the antenna 640. In some such implementations, the transceiver 630 can be implemented as at least one RF transmitter and at least one separate RF receiver. The transceiver 630 may communicate bi-directionally, via one or more antennas, wired, or wireless communication links as described above. For example, the transceiver 630 may represent a wireless transceiver and may communicate bi-directionally with another wireless transceiver, such as a wireless transceiver associated with the sink devices, or the wireless earbuds 112, 114, 212, 214, 312 and 314, depicted in FIGS. 1-3. The transceiver 630 also may include a modem to modulate the packets and provide the modulated packets to the antennas for transmission, and to demodulate packets received from the antennas.

The display 660 can be implemented from any suitable display technology. For example, the display 660 can be implemented from a liquid crystal display (LCD), an e-ink display, a digital microshutter (DMS) display, or an interferometric modulator (IMOD) display. Additionally, the display 660 can be implemented as a flat-panel display, such as plasma, electroluminescent (EL) displays, organic light emitting diode (OLED) display, super twisted nematic (STN) display, or thin-film transistor (TFT) LCD, or a non-flat-panel display, such as a cathode ray tube (CRT) or other tube device. The microphone 680 and the camera 690 allow the source device 600 to be suitable for engaging in voice and video communications.

Figure 7:
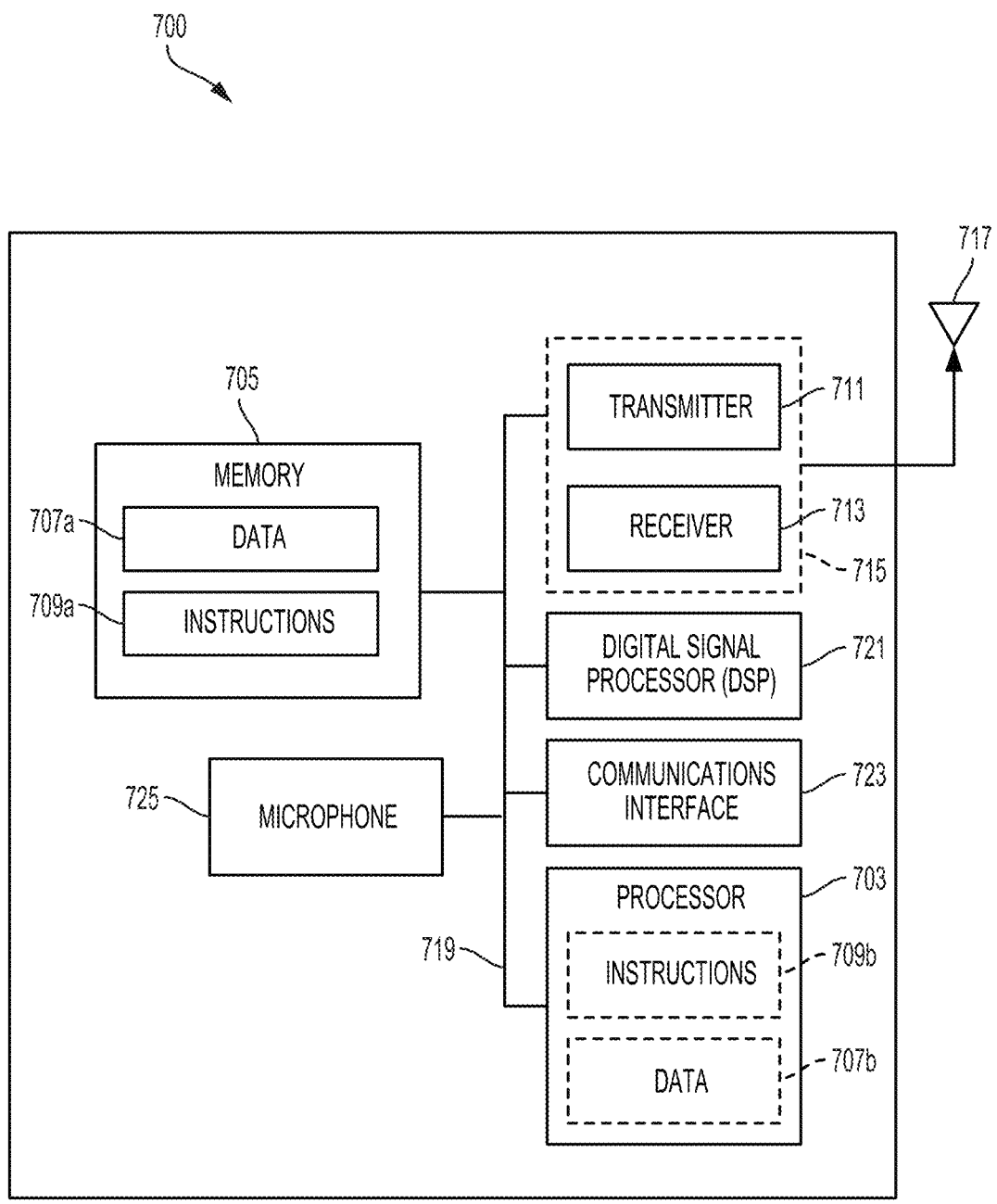
FIG. 7 shows example components that may be included within a sink device.

FIG. 7 shows example components that may be included within a sink device 700. The sink device 700 is representative of a wide variety of electronic devices as described throughout, including and not limited to the wireless earbuds 112, 114, 212, 214, 312 and 314, described with reference to FIGS. 1-3.

The sink device 700 includes a processor 703. The processor 703 may be a general-purpose single- or multi-chip microprocessor (such as an Advanced RISC (Reduced Instruction Set Computer) Machine (ARM)), a special purpose microprocessor (such as a digital signal processor (DSP)), a microcontroller, a programmable gate array (such as a field programmable gate array (FPGA)), a shift register, etc. The processor 703 may be referred to as a central processing unit (CPU). Although just a single processor 703 is depicted in the sink device 700 of FIG. 7, in alternative implementations, a combination of processors (such as an ARM and DSP) including multiple processors, multiple cores, multiple nodes, or implementing multi-threading, etc., can be used.

The sink device 700 also includes memory 705 in electronic communication with the processor 703 (i.e., the processor can read information from and write information to the memory 705). The memory 705 can be deemed to be in electronic communication with the processor 703 if the processor 703 can read information from or write information to the memory 705. The memory 705 may be any electronic component capable of storing electronic information. The memory 705 may be configured as random-access memory (RAM), read-only memory (ROM), non-volatile random-access memory (NVRAM), magnetic disk storage media, optical storage media, flash memory devices in RAM, on-board memory included with the processor, erasable programmable read-only memory (EPROM), electrically erasable programmable read-only memory (EEPROM), registers and so forth, including combinations thereof.

Data 707a and instructions 709a may be stored in the memory 705. The instructions may include one or more programs, routines, sub-routines, functions, procedures, code, etc. The instructions may include a single computer-readable statement or many computer-readable statements. The instructions 709a may be executable by the processor 703 to implement the methods disclosed herein. Executing the instructions 709a may involve the use of the data 707a that is stored in the memory 705. When the processor 703 executes the instructions 709, various portions of the instructions 709b may be loaded onto the processor 703, and various pieces of data 707b may be loaded onto the processor 703.

The memory 705 also can store processor- or computer-executable software code containing instructions that, when executed, cause the processor 703 to perform various functions described herein for magnetic communication, including reception of a signal, and generation and transmission of an appropriate response signal.

The sink device 700 also may include a transmitter 711 and a receiver 713 to allow transmission and reception of signals to and from the sink device 700 via one or more antennas 717. The transmitter 711 and receiver 713 may be collectively referred to as a transceiver 715. The transceiver 715 also may include a modem to modulate the packets and provide the modulated packets to the antennas for transmission, and to demodulate packets received from the antennas. The sink device 700 also may include (not shown) multiple transmitters, multiple antennas, multiple receivers, and multiple transceivers. For example, the transceiver 715 can be implemented as at least one RF transmitter and at least one separate RF receiver. Alternatively, the transceiver 715 can be implemented as at least one RF transmitter and receiver and at least one magnetic communication-based transmitter and receiver. The processor 703 processes information received through the transceiver 715 as well as information to be sent to the transceiver 715 for transmission through the antenna 717.

The transceiver 715 may communicate bi-directionally, via one or more antennas, wired, wireless, or magnetic communication links as described above. For example, the transceiver 715 may represent a wireless transceiver in a first sink device and may communicate with another wireless transceiver in a second sink device, such as the wireless transceivers associated with the wireless earbuds 112, 114, 212, 214, 312 and 314, described with reference to FIGS. 1-3.

The sink device 700 may include a digital signal processor (DSP) 721. The sink device 700 also may include a communications interface 723. The communications interface 723 can be implemented as a user interface (UI) (such as a keypad, touchscreen, voice or gesture interface), and may allow a user to interact with the sink device 700. The sink device 700 also may include a microphone 725 (representative of a microphone and a speaker) for playing audio data.

The various components of the sink device 700 may be coupled together by one or more buses, which may include a power bus, a control signal bus, a status signal bus, a data bus, etc. For the sake of clarity, the various buses are illustrated in FIG. 7 as a bus system 719.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described throughout. Whether such functionality is implemented in hardware or software depends upon the particular application and design constraints imposed on the overall system. A person having ordinary skill in the art will appreciate that various aspects also can be described as functional equivalents to the structures, materials or devices disclosed herein.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A role change method between a first earbud and a second earbud, comprising:
   obtaining, by the second earbud, a clock (CLK) signal of the first earbud, wherein the first earbud is a master device, and the second earbud is a slave device;
   obtaining, by the second earbud, a Bluetooth slot boundary signal of the first earbud;
   receiving, by the second earbud, a role change request from the first earbud, wherein the role change request is based on determining that a remaining battery charge at the first earbud is less than a remaining battery charge at the second earbud;
   sending, by the second earbud, a role change acceptance command to the first earbud; and
   changing roles of the first and second earbuds in less than 80 slots from the role change request, wherein the first earbud becomes the slave device, and the second earbud becomes the master device.

2. The method of claim 1, wherein the second earbud obtains the CLK signal and Bluetooth slot boundary signal over a Bluetooth communication link with the first earbud.

3. The method of claim 1, wherein the second earbud obtains the CLK signal and Bluetooth slot boundary signal by passively listening on a wireless connection between the first earbud and a source device.

4. The method of claim 3, wherein the source device is one of a smartphone, a mobile device, a laptop computer, a tablet device, a wearable device, an Internet of Things (IoT) device, an Internet of Everything (IoE) device, an IoT hub, or an IoE hub.

5. A role change method between a first earbud and a second earbud, comprising:
   obtaining, by the second earbud, a clock (CLK) signal of the first earbud, wherein the first earbud is a master device, and the second earbud is a slave device;
   obtaining, by the second earbud, a Bluetooth slot boundary signal of the first earbud;
   receiving, by the second earbud, a role change request from the first earbud, wherein the role change request is based on determining that radio channel conditions between the first earbud and a source device are less favorable than radio channel conditions between the second earbud and the source device;
   sending, by the second earbud, a role change acceptance command to the first earbud; and
   changing roles of the first and second earbuds in less than 80 slots from the role change request, wherein the first earbud becomes the slave device, and the second earbud becomes the master device.

6. A role change method between a first earbud and a second earbud, comprising:
   obtaining, by the second earbud, a clock (CLK) signal of the first earbud, wherein the first earbud is a master device, and the second earbud is a slave device;
   obtaining, by the second earbud, a Bluetooth slot boundary signal of the first earbud;
   receiving, by the second earbud, a role change request from the first earbud;
   sending, by the second earbud, a role change acceptance command to the first earbud; and
   changing roles of the first and second earbuds in less than 80 slots from the role change request, wherein changing roles of the first and second earbuds occurs without communicating a frequency hopping selection (FHS) packet, and wherein the first earbud becomes the slave device, and the second earbud becomes the master device.

7. A second wireless node in wireless communication with a first wireless node, wherein the first wireless node is a master node, and the second wireless node is a slave node, comprising:

a processor;

memory in electronic communication with the processor; and instructions stored in the memory and operable, when executed by the processor, to cause the second wireless node to:

obtain a clock (CLK) signal of the first wireless node;

obtain a Bluetooth slot boundary signal of the first wireless node;

receive a role change request from the first wireless node, wherein the role change request is based on a determination that a remaining battery charge at the first wireless node is less than a remaining battery charge at the second wireless node;

send a role change acceptance command to the first wireless node; and change roles with the first wireless node in less than 80 slots from the role change request, wherein the first wireless node becomes the slave node and the second wireless node becomes the master node.

8. The second wireless node of claim 7, wherein the CLK signal and Bluetooth slot boundary signal are obtained over a Bluetooth communication link with the first wireless node.

9. The second wireless node of claim 7, wherein the CLK signal and Bluetooth slot boundary signal are obtained by passively listening on a wireless connection between the first wireless node and a source device.

10. The second wireless node of claim 7, wherein the first and second wireless nodes are wireless earbuds.

11. A second wireless node in wireless communication with a first wireless node, wherein the first wireless node is a master node, and the second wireless node is a slave node, comprising:

a processor;

memory in electronic communication with the processor; and instructions stored in the memory and operable, when executed by the processor, to cause the second wireless node to:

obtain a clock (CLK) signal of the first wireless node;

obtain a Bluetooth slot boundary signal of the first wireless node;

receive a role change request from the first wireless node, wherein the role change request is based on determining that radio channel conditions between the first wireless node and a source device are less favorable than radio channel conditions between the second wireless node and the source device;

send a role change acceptance command to the first wireless node; and change roles with the first wireless node in less than 80 slots from the role change request, wherein the first wireless node becomes the slave node and the second wireless node becomes the master node.

12. A second wireless node in wireless communication with a first wireless node, wherein the first wireless node is a master node, and the second wireless node is a slave node, comprising:

a processor;

memory in electronic communication with the processor; and instructions stored in the memory and operable, when executed by the processor, to cause the second wireless node to:

obtain a clock (CLK) signal of the first wireless node;

obtain a Bluetooth slot boundary signal of the first wireless node;

receive a role change request from the first wireless node;

send a role change acceptance command to the first wireless node; and change roles with the first wireless node in less than 80 slots from the role change request, wherein changing roles with the first wireless node occurs without exchanging a frequency hopping selection (FHS) packet, and wherein the first wireless node becomes the slave node and the second wireless node becomes the master node.

13. A non-transitory computer-readable medium comprising processor-executable program code configured to cause a processor of a second earbud, in wireless communication with a first earbud, to:

obtain a clock (CLK) signal of the first earbud, wherein the first earbud is a master device, and the second earbud is a slave device;

obtain a Bluetooth slot boundary signal of the first earbud;

receive a role change request from the first earbud;

send a role change acceptance command to the first earbud; and change roles with the first earbud in less than 80 slots from the role change request, wherein changing roles with the first earbud occurs without exchanging a frequency hopping selection (FHS) packet, wherein the first earbud becomes the slave device, and the second earbud becomes the master device.

14. The non-transitory computer-readable medium of claim 13, wherein the CLK signal and Bluetooth slot boundary signal are obtained over a Bluetooth communication link with the first earbud.

15. The non-transitory computer-readable medium of claim 13, wherein the CLK signal and Bluetooth slot boundary signal are obtained by passively listening on a wireless connection between the first earbud and a source device.

16. The non-transitory computer-readable medium of claim 13, wherein the role change request is based on determining that radio channel conditions between the first earbud and a source device are less favorable than radio channel conditions between the second earbud and the source device.

17. The non-transitory computer-readable medium of claim 13, wherein the role change request is based on determining that a remaining battery charge at the first earbud is less than a remaining battery charge at the second earbud.

* * * * *